F. C. BLACKBURN.
TEAKETTLE AND OTHER BOILING RECEPTACLE.
APPLICATION FILED OCT. 21, 1921.
1,435,579.
Patented Nov. 14, 1922.
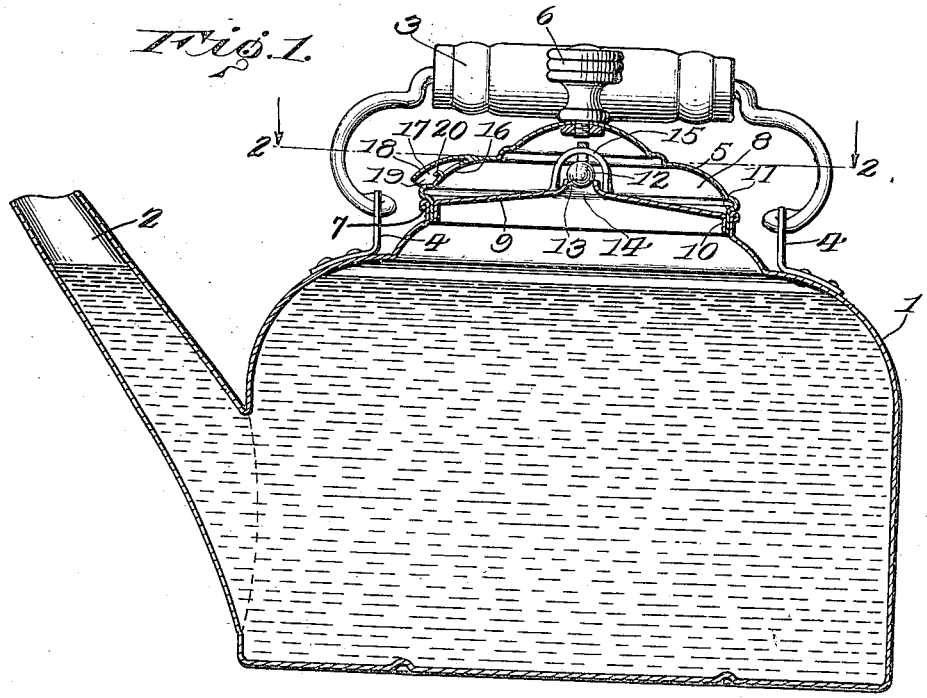
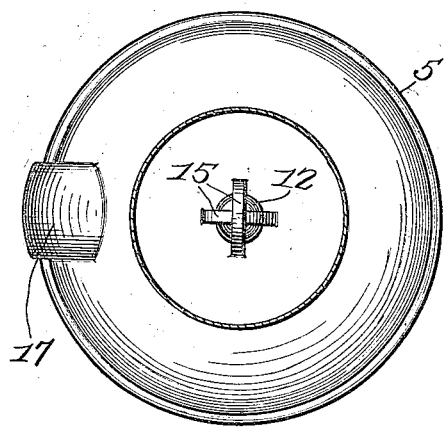
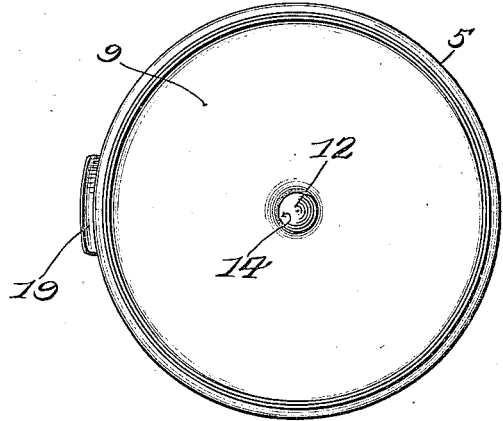
Inventor
Frank C. Blackburn
By
his Attorney Patented Nov. 14, 1922.

1,435,579

UNITED STATES PATENT OFFICE.

FRANK C. BLACKBURN, OF MALTA BEND, MISSOURI.

TEAKETTLE AND OTHER BOILING RECEPTACLE.

Application filed October 21, 1921. Serial No. 509,381.

*To all whom it may concern:*

Be it known that I, FRANK C. BLACKBURN, a citizen of the United States, residing at Malta Bend, in the county of Saline and State of Missouri, have invented certain new and useful Improvements in Teakettles and Other Boiling Receptacles, of which the following is a specification.

My invention relates to receptacles used for boiling purposes such as tea kettles for example.

An object of the invention is to provide a lid for tea kettles and other boiling receptacles which will permit the escape of steam in such a manner as to prevent excessive heating of the lid and burning of the hands.

Another object of my invention is the production of a kettle or similar article wherein steam is allowed to escape through a comparatively simple self-closing valve adapted to be opened by the pressure of the steam within the kettle and closed by the gravitation of the valve upon its seat when the pressure is relieved.

A further object of the invention is to produce a lid for tea kettles or similar boilers, said lid being formed with a chamber into which the steam is admitted through the valve, aforesaid, and subsequently discharged in a downwardly direction and at a point in said lid remote from the handle of the kettle.

With these and other objects in view the invention further consists in the comparatively simple and inexpensive construction of the parts hereinafter described and pointed out in the apppended claims.

In the accompanying drawings illustrating an embodiment of my invention as applied to a tea kettle, Fig. 1 is a vertical sectional view through a kettle showing my improved lid in position thereon;

Fig. 2 is a horizontal sectional view through the lid on the line 2—2 of Fig. 1; and Fig. 3 is a bottom plan of the lid.

My present invention has been designed to more effectually liberate the steam which collects within the dome of the kettle, thereby cooling the lid and making it more easily removed without danger of burning the hands. The relative life of the lid is also increased by my present construction, the knob for example being unaffected by the comparatively low temperature resulting from the use of my improved lid.

Referring to the drawings in which corresponding reference characters designate similar parts in the several views, the kettle 1 is formed with the spout 2, and handle 3 secured to projections 4 extending from the top of the kettle, as shown. I have illustrated a tea kettle upon which my improved lid is fitted, but it will be understood that said lid is equally useful upon other types of boilers, and I do not limit myself to the exact application and disclosure as herein presented.

The lid 5 is preferably constructed to maintain its known appearance, and is provided with the usual knob 6 by which the lid is removed and replaced.

An opening is formed in the top of the kettle and into the flanged wall 7 surrounding said opening, the lid 5 is positioned as clearly shown in Fig. 1. The size of the opening and lid I prefer to keep standard, thereby permitting the ready usage and adoption of my improved lid upon various capacity kettles as now constructed.

A compartment or chamber 8 is formed in the lid by inserting a wall 9 in the bottom of the lid and securing the flange 10 thereof to the inner face of the usual flange 11 formed on the present lids. The flanges 10 and 11 may be joined together in any suitable way as will be understood. The wall 9 may in some cases be removably associated with said lid by means of a tight sliding fit, or other retaining devices.

The valve 12 is located centrally of the wall 9 and is designed to rest upon the seat 13 encircling the opening 14. I have shown a ball valve of a weight proportional to the lifting force exerted by the steam at a comparatively low pressure, thereby insuring the lifting of the valve and permitting the discharge of steam before reaching a higher pressure. The ball valve is confined within a cage-like closure 15 which prevents its abnormal removal from the seat. The cage 15 is formed of curved rods or wire which may be soldered or otherwise secured to the wall 9.

The chamber 8 formed within the dome of the lid is of a capacity sufficiently large to receive a maximum quantity of steam and permit its immediate expansion and discharge. An opening 16 provided in a spout-like discharge 17 communicates with the interior of the chamber 8. The opening 16 is formed within the wall of the lid and at or substantially near the peripheral edge thereof. The discharge spout 17 is arranged to conform generally to the curvature of the dome-like lid, see Fig. 1, thereby maintaining an appearance not noticeably unlike ordinary tea kettle lids. This is an advantage over known constructions wherein a long and unsightly spout or tube has established communication between the dome of the lid and the pouring spout.

The discharge spout is formed with an upper wall 18 which is curved downwardly, said wall terminating into the relatively wide and slot-like discharge opening 19 at the edge of the lid. A deflecting lip 20 may be struck up from the material which is cut out of the lid to form the opening 16. This lip serves to direct the steam upwardly against the curved wall 18 so that the ultimate discharge of all of the steam from the spout is in a downward direction. In providing the discharge opening for the steam at the edge of the lid and directing the passage of the steam downwardly, I have found that there is a cooling of the lid and the high temperatures heretofore experienced are materially reduced, thereby preventing injury to the hands and increasing the life of the lid.

In operation the vapor and steam rise against the wall or partition 9. When for example the boiling point has been reached and an accumulated pressure occurs beneath the wall 9, the valve 12 is lifted by the steam from its seat and allowed to escape into the chamber 8. From the said chamber the steam rapidly finds its way out through the opening 16 in the wall of the lid into the discharge spout 17, and thence downwardly and out through the relatively wide opening 19 into the atmosphere. By the time the steam has passed through the foregoing stages and been discharged downwardly at a remote point upon the edge of the lid, its heating and burning qualities are substantially expended.

When the pressure of the steam has been reduced the valve returns to its seat. Steam can now collect in the kettle beneath the wall 9 until the valve is again lifted. During the time of the accumulation of the steam and its pressure the top or dome portion of the kettle remains cool as it is protected by the wall or partition 9. As a result the handle of the kettle as well as the knob of the lid can be readily grasped without fear of burning.

Various changes in the construction of my hollow lid and arrangement of the several parts therein can be made as will properly fall within the scope of my invention which I now particularly define.

I claim:

1. A lid for tea kettles and other boiling receptacles provided with a wall spaced from the lid and forming a chamber, means for establishing communication between the aforesaid chamber and the interior of a tea kettle or other boiling receptacle when a predetermined pressure has been reached, and means for establishing communication between the aforesaid chamber and the atmosphere, said means being located at a point remote from said first named means.

2. A lid for tea kettles and other boiling receptacles provided with a wall spaced from the lid and forming a chamber, means including a valve located in said wall for establishing communication between the aforesaid chamber and the interior of a tea kettle or other boiling receptacle when a predetermined pressure has been reached, and an opening in said lid for establishing communication between the said chamber and the atmosphere.

3. A lid for tea kettles and other boiling receptacles provided with a wall spaced from the lid and forming a relatively large chamber, a valve adapted to establish communication between the aforesaid chamber and the interior of a tea kettle or other boiling receptacle when a predetermined pressure is reached, and a discharge means for permitting the escape of steam from the aforesaid chamber.

4. A hollow lid for tea kettles and other boiling receptacles having a wall spaced from the dome of the lid, a chamber formed between the dome and said wall, a self-seating valve in said wall, said valve being arranged to establish communication between the aforesaid chamber and the interior of a tea kettle or other boiling receptacle when a predetermined pressure has been reached, and means for discharging the contents of the aforesaid chamber at or near the peripheral edge of the lid.

5. A hollow lid for tea kettles and other boiling receptacles provided with a wall spaced from the lid to form a chamber, a self-seating valve for establishing communication between the aforesaid chamber and the interior of a tea kettle or other boiling receptacle when a predetermined pressure has been reached, and a discharge spout located near the peripheral edge of the lid and adapted to establish communication between the aforesaid chamber and atmosphere.

6. A tea kettle including a removable lid, said lid being formed with a hollow chamber, means for establishing communication between the said hollow chamber and the interior of the tea kettle when a predetermined pressure has been reached, and means including an opening near the edge of said lid for directing escaping steam from the chamber to the atmosphere at a remote point from the handle of the kettle.

In testimony whereof I affix my signature.

FRANK C. BLACKBURN.